Jan. 12, 1954     A. S. GUTMAN     2,666,154
REVERSIBLE RADIAL AIR GAP EDDY CURRENT CLUTCH
Filed May 17, 1951     2 Sheets-Sheet 1
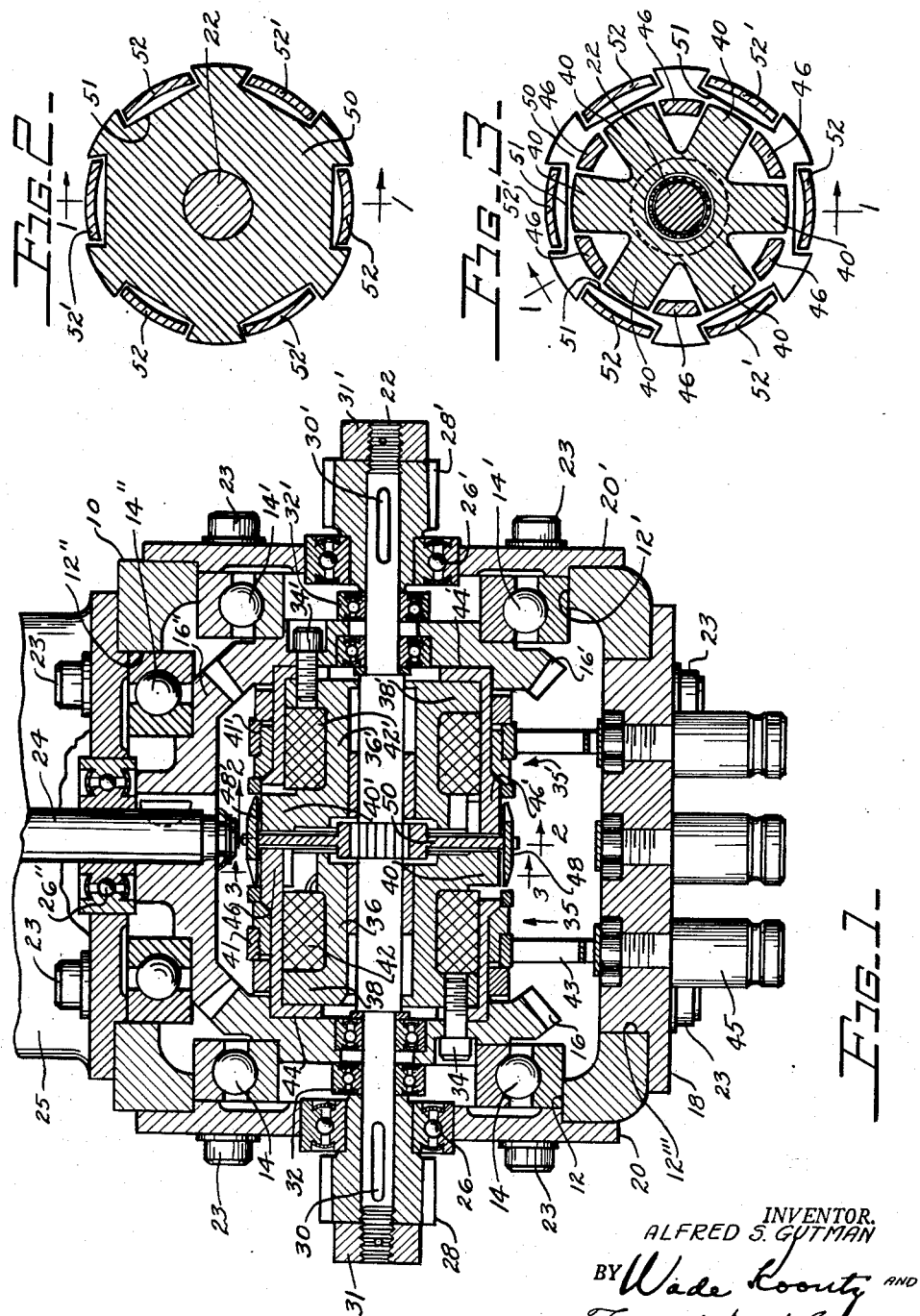
INVENTOR.
ALFRED S. GUTMAN
BY Wade Koonty AND
Frederick W. Cotterman
ATTORNEYS Patented Jan. 12, 1954

2,666,154

UNITED STATES PATENT OFFICE 2,666,154

REVERSIBLE RADIAL AIR GAP EDDY CURRENT CLUTCH

Alfred S. Gutman, Brookline, Mass.

Application May 17, 1951, Serial No. 226,926

5 Claims. (Cl. 310—99)

(Granted under Title 35, U. S. Code (1952), sec. 266)

The invention described herein may be manufactured and used by or for the United States Government for governmental purposes without payment to me of any royalty thereon.

This invention relates to eddy current clutches and particularly to a reversible eddy current clutch having a radial air gap.

In most eddy current clutch motors, it is very desirable to have a small air gap between the eddy current member and the poles so as to develop a larger torque and thereby obtain a greater degree of efficiency. In prior art devices it has been impossible to maintain a small air gap, since the output shaft, disc, eddy current members, poles and rotors must be made with a certain amount of manufacturing eccentricities. Since these eccentricities when added up may cause binding and a considerable amount of wear between the eddy current members and the poles, a larger air gap must be maintained to eliminate any such possibilities. It is, therefore, an object of this invention to provide a relatively small air gap between an eddy current member and magnetic poles which heretofore has been impossible.

Attempts have been made in the past to increase the torque of eddy current clutches in speed regulation servos by use of magnetic fluid. However, this presents difficulties such as keeping the iron particles in suspension, preventing deterioration of the fluid due to oxidation, and properly sealing the fluid, which has abrasive qualities. Further, experience has shown that the viscous drag in a magnetic fluid clutch is considerable and prevents high speed operation without excessive heat development. Therefore, it is a further object of this invention to provide an eddy current clutch, using a radial air gap and floating eddy current member assembly, so as to permit a small air gap without maintaining unreasonable machining tolerances and thereby develop high torque without requiring a magnetic fluid.

It is a still further object of this invention to provide an eddy current clutch servo comprising a pair of rotors oppositely driven by an input means, coils mounted in each of the rotors, cup shaped members positioned over said rotors and coils so that the rotors and the cup shaped members provide north and south poles. A pair of eddy current sleeve members are floatingly mounted over the north and south poles and interlock with a disc. The disc is connected to an output shaft so that upon either one of the rotors being energized a flux will be created between one of the eddy current members and poles so that the eddy current member will rotate with that rotor and thereby rotate the disc and output shaft in the direction of that rotor. In order for the output shaft to be rotated in the opposite direction the other rotor is energized so that the other sleeve will rotate with that rotor in the opposite direction thereby rotating the shaft in the opposite direction. By floatingly positioning the eddy current sleeve members over the north and south poles a close radial air gap is obtained which gives higher torque values and also takes care of the machining eccentricities between the various elements. The eddy current sleeve members are free to float since they have their own separate centers of rotation.

Other objects will become apparent as the invention is described in detail, reference being had to the drawing, wherein:

Fig. 1 is an axial section taken at 1—1 of Figs. 2 or 3 through the improved clutch which is the subject of this invention.

Fig. 2 is a central transverse section taken at 2—2 of Fig. 1 through the driven element of the device.

Fig. 3 is a transverse section taken at 3—3 of Fig. 1 through the poles of one of the two magnetic pole assemblies.

Figure 4:
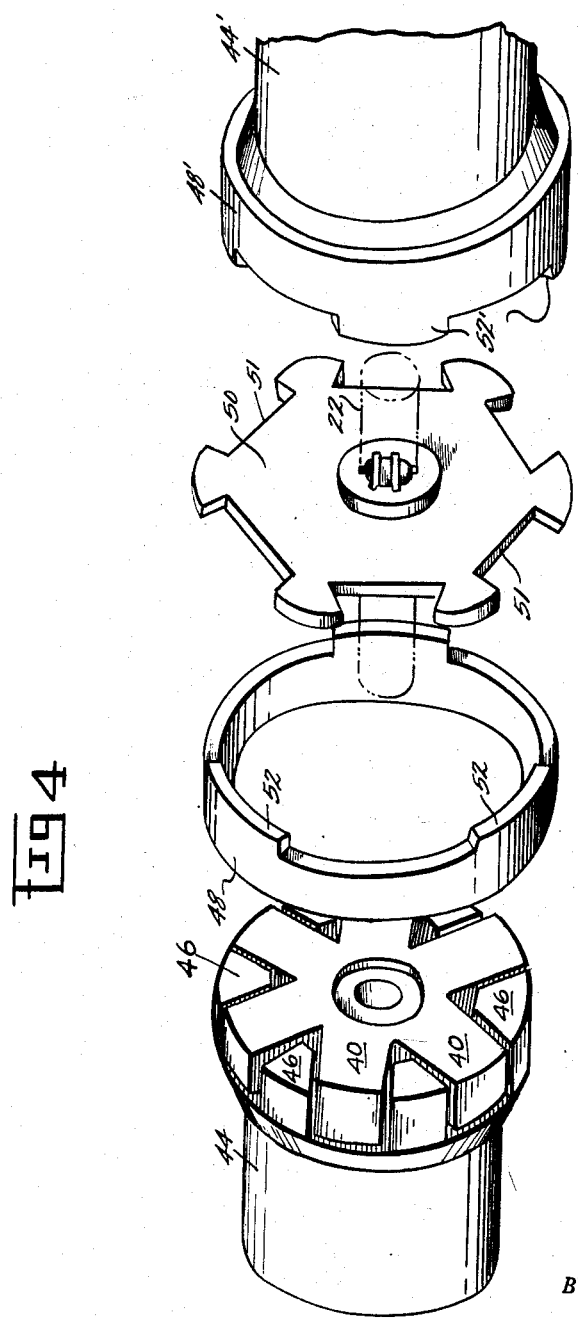
Figure 4 is a view showing the relationship of the poles sleeve members and output disc.

Referring now to the drawing an aluminum (nonmagnetic) housing 10 is bored on four sides as at 12, 12', 12'' and 12'''. Bores 12, 12' and 12'' support ball bearings 14, 14' and 14'', respectively, which in turn support bronze or other nonmagnetic miter gears 16, 16' and 16''. Bore 12''' is used to support a plastic terminal plate 18. Aluminum cover plates 20 and 20' enclose ball bearings 14 and 14'. A motor 25 encloses the bore 12'' and is drivably connected, through the input shaft 24, to the miter gear 16''. The cover plates 20, 20', the terminal plate 18 and the motor 25 are all held to the housing by screws 23.

A main output shaft 22 made from 18-8 stainless steel or other nonmagnetic material and the input shaft 24 are supported for rotation in the housing 10 by ball bearings 26, 26' and 26'', respectively, which are in turn supported in the end plates 20, 20' and the motor 25. Pinions 28 and 28' are secured to the shaft 22 by keys 30 and 30' and nuts 31 and 31'. Thrust bearings 32 and 32' are provided to take the axial thrust of the shaft 22.

Attached to the inner face of the miter gears 16 and 16' by screws 34 and 34' are the ferromagnet core and coil assemblies 35 and 35' which comprise cylindrical coil and core portions 36 and 36' each having a flange 38 and 38' at the outer end and a circumferentially spaced series of pole lugs 40 or 40' at the inner end, the coils 42 and 42' being wound between the flanges 38 or 38' and the lugs 40 and 40', whichever coil is being wound. Slip rings 41 and 41' are insulatedly carried on the outside of the core and coil assemblies 35 and 35'. Brushes 43 extend from terminal posts 45 through which the coils 42 and 42' may be selectively energized. The thrust bearings 32 and 32' on the output shaft 22 hold the shaft against axial movement. The iron coil cover members 44 and 44' surround the coil flanges 38 and 38' and have a series of lugs 46 and 46' extending axially toward each other. Iron sleeves 48 and 48' surround lugs 40 and 46 as well as 40' and 46'.

A nonmagnetic disc 50 is fast on the ouput shaft 22, disc 50 being peripherally notched as at 51 to engage teeth 52 and 52' extending axially toward each other from the iron sleeves 48 and 48'. The disc 50 has six notches, three of which are occupied by the three rightward extending teeth 52 on sleeve 48 and three of which are occupied by the three leftward extending teeth 52' on sleeve 48'.

Referring only to the left hand core and coil assembly 35, the coil 42 is wound on the magnetic core 36 between the integral flanges 38 and 40 of the core. The left flange 38 is circular and is tapped for the screws 34. The right hand flange, however, is V-notched at six places so as to be divided into the six poles 40 (see Fig. 3). The cup shaped iron cover 44 is thickened at the open end of the cup and this open end is cut away at six places so as to leave lugs 46 on the cup extending axially toward the right into the V notches between poles 40 (see Fig. 3), and leaving air gaps of considerable size between between adjacent poles 40 and 46. The input shaft 24 is always driven in the same direction whereby the miter gears 16 and 16' are rotated in the opposite direction. When current is passed through the coil 42, magnetic flux flows axially through the core 36, then radially to the outer ends of poles 40, at which point the flux in each pole 40 divides, half jumping the air gap at the right of a pole 40 and the other half jumping an air gap to the left of the pole 40. The flux now returns through the negative poles 46 on the outer ends of the cover 44, then through the cover 44, then radially inward through the flange 38 back to the beginning. It is noted that the flux for each pole travels circumferentially only at the endcs of the positive poles 40, across the air gaps between positive poles 40 and negative poles 46 and into the negative poles 46. It is at these points that the outer ends of the poles 40 and 46 lie close up to the inner surface of the sleeve 48. In order to show the several parts more clearly, however, the actual space between the outer ends of the poles 40 and 46 and the inner surface of the sleeve 48 is greatly magnified in the drawing, the actual space being only .0005 inch, whereas for clarity this space is enlarged.

It is pointed out that one floating sleeve member may be used in single direction motors wherever high torque values are desired.

I claim:

1. An eddy current clutch which comprises a hollow housing, an output shaft having rotative bearing in the ends of said hollow housing, a pair of axially spaced apart mitre gears concentrically surrounding and freely rotatable about the axis of said output shaft, an input shaft having bearing in said housing with axis normal to the axis of the output shaft, a third mitre gear on said input shaft in mesh with said pair of axially spaced mitre gears, an ironclad electromagnetic core and coil assembly concentrically secured at the outer end to the inner face of each of the said axially spaced mitre gears with north and south poles at the inner end facing each other, a nonmagnetic disc fast on the output shaft between the ends of the pole pieces, said disc having an even number of peripheral notches, sleeves, one on each side of said disc having a continuous surface freely surrounding said pole pieces, said sleeves each having lugs on the inner edges extending into the peripheral notches in said discs, said continuous surfaces forming eddy current members so that upon being energized the sleeve will drive said non-magnetic disc and output shaft.

2. An eddy current clutch which comprises a housing, an output shaft having rotative bearing in said housing, a peripherally notched nonmagnetic disc fast on said shaft intermediate the ends thereof, a free floating sleeve on each side of said disc, said sleeves each having a continuous surface and a series of lugs extending axially into one or more of the peripheral notches, two cylindrical coaxial ironclad electromagnets, one adjacent each side of said disc, both rotatable freely on said output shaft and both having poles rotatable freely inside said sleeves, means to simultaneously rotate said electromagnets one opposite the other and means to selectively energize said electromagnets, said continuous surfaces forming eddy current members so that upon being energized the sleeve will drive said magnetic disc and output shaft.

3. The structure defined in claim 2 wherein, at the end adjacent the nonmagnetic disc, the core of the ironclad electromagnet has a series of pole pieces extending radially, and where the cover of the ironclad electromagnet, at the end adjacent the nonmagnetic disc, has an equal number of pole pieces extending axially between the radial pole pieces leaving airgaps therebetween, so that the flux travels circumferentially at the poles and the both ends, across the air gap therebetween and through the adjacent sleeve.

4. In an eddy current clutch comprising in combination an input means, a pair of rotors adapted to be rotated in opposite directions by said input means, poles on said rotors, an output shaft, a disc secured to said output shaft, a pair of eddy current sleeve members adapted to rotate said disc in two directions, said sleeve members being floatingly positioned about said rotor and about said poles, said sleeve members adapted to center themselves about said rotors and poles upon relative rotation therebetween without binding and thereby permitting a small radial air gap, said sleeve members having an axis of rotation separately movable from the axis of the rotor and poles.

5. In an eddy current clutch servo, said clutch adapted to produce high torque values as a result of small radial air gaps, said clutch comprising a rotor provided with poles, an eddy current sleeve member floatingly positioned adjacent to the poles of the rotor to form a small air gap therebetween, said sleeve member having an axis of rotation which is movable with respect to the axis of rotation of the rotor and poles so as to center itself therewith, whereby unreasonable manufacturing tolerances are not required to maintain a small radial air gap.

ALFRED S. GUTMAN.

References Cited in the file of this patent

UNITED STATES PATENTS

| Number | Name | Date |
|---|---|---|
| 803,322 | Bacon | Oct. 31, 1905 |
| 919,460 | Price | Apr. 27, 1909 |
| 1,756,671 | Alden | Apr. 29, 1930 |
| 2,289,330 | Fischer | July 7, 1942 |
| 2,313,466 | Dicke | Mar. 9, 1943 |
| 2,305,963 | Hanson | Dec. 22, 1942 |
| 2,357,516 | Jacobs | Sept. 5, 1944 |

FOREIGN PATENTS

| Number | Country | Date |
|---|---|---|
| 752,796 | France | July 24, 1933 |